May 20, 1930.  A. O. HOLVECK, JR  1,759,788
OIL GAUGE WIPER
Filed June 1, 1929
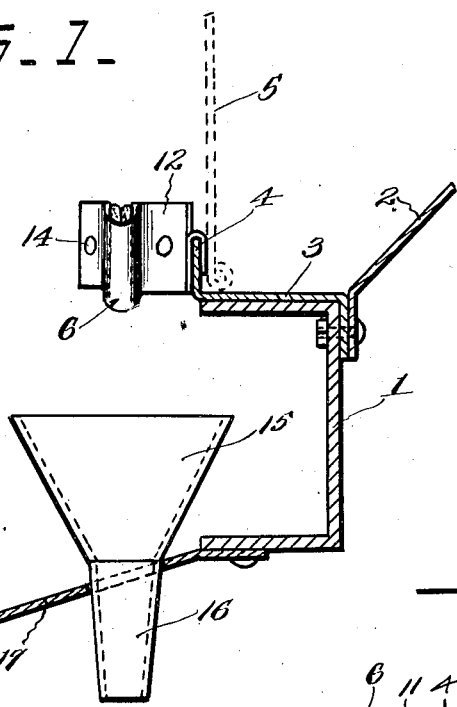
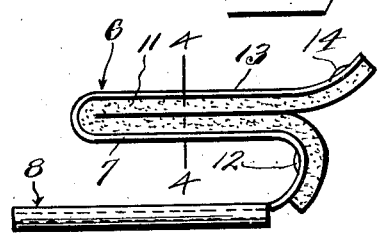
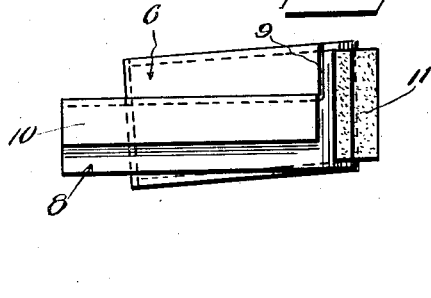
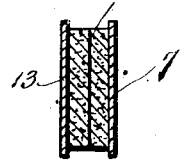
Inventor
A. O. Holveck, Jr
By Watson E. Coleman
Attorney Patented May 20, 1930

1,759,788

UNITED STATES PATENT OFFICE

ALPHA O. HOLVECK, JR., OF VICTORIA, TEXAS

OIL-GAUGE WIPER

Application filed June 1, 1929. Serial No. 367,721.

This invention relates to attachments for motor vehicles and pertains particularly to a wiper adapted to be attached to the motor vehicle beneath the hood and at one side of the engine to be used for wiping the oil gauge rod so that when the same is inserted into the engine casing and the oil therein, the height which the oil reaches therein can be accurately determined.

A further object of the present invention is to provide a wiper which may be easily and quickly attached to the engine frame or hood sill and which when in position will drain the oil accumulated thereon by drawing the oil rod therethrough, from one point from which it may be conveyed through the lower part of the engine to the ground.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention, as expressed in the appended claims.

In the drawing:—

Figure 1 is a view in transverse section of a portion of a motor vehicle frame and certain of the structure carried thereby showing the application of the device embodying the present invention.

Figure 2 is a view in top plan of the wiper.

Figure 3 is a view in side elevation of the wiper.

Figure 4 is a view taken transversely of the wiper upon the line 4—4 of Figure 2.

Referring more particularly to the drawing wherein like numerals of reference indicate corresponding parts throughout the several views, the numeral 1 indicates a portion of a motor vehicle frame showing the upper portion 2 of an adjacent fender apron from which is extended inwardly over the top of the frame the hood cover sill portion 3 which is turned upwardly as at its inner edge forming the flange 4. The engine hood rests at one edge upon the portion 3 of the apron and normally positions close to the flange 4, as shown. A portion of the hood is indicated by the numeral 5.

The device embodying the present invention comprises a substantially U-shaped body 6 formed of flat resilient metal one side of the body, as for example the side 7, being turned back to provide the flat arm 8, the upper part of which is cut a short distance transversely as indicated at 9 and turned down to provide the longitudinally extending resilient tongue 10. This tongue in association with the arm proper frictionally engages or receives the flange 4 so as to support the U-shaped body 6 in horizontal position in the manner shown.

As shown in Figure 3 the body 6 is arranged at a slight angle with respect to the arm 8 so that the rear or yoke portion of the body 6 will be arranged in a plane below the other part of the device and oil accumulating thereon will run to and drain from this lower end.

Covering the inner faces of the sides or legs of the body 6 is a strip of relatively thick felt 11 one end being turned over the rounded forward end of the side or leg 7 of the body and riveted thereto, as indicated at 12, while the other end is carried all the way to the end of the leg 13 and secured thereto, as indicated at 14. As shown, the free end of the leg 13 is extended beyond the leg 7 and is turned laterally so that a V-shaped guide recess is formed which facilitates the application or positioning of the engine oil gauge rod (not shown) between the contacting faces of the bent strip of felt material.

Positioned directly beneath the lower portion of the body 6 is a funnel body 15, the discharge spout 16 of which is directed downwardly through the engine oil pan or belt 17 to drain oil received from the wiper to the ground.

From the foregoing description it will be readily appreciated that with a device of the character herein described an engine oil gauge rod may be easily and quickly wiped dry of oil so that proper gauging of the oil contents of the engine casing may be made and the character of the gauge rod wiper is such that it may be readily applied or removed from position.

Having thus described my invention, what I claim is:—

1. A wiper for oil gauge rods of internal combustion engines comprising a pair of resilient arm members connected at one end and arranged in spaced relation, a wiping padding overlying the inner faces of the arms, the body of material upon the arms being in contact, and means carried by one of said arms for frictionally engaging a supporting body, said means comprising an elongated arm member having an integral resilient tongue associated therewith and said wiping material carrying arms being arranged at an inclination with respect to the supporting arm to drain oil from one end of the device.

2. A gauge rod wiper for internal combustion engines comprising a substantially U-shaped body of resilient material having each arm at its free end turned outwardly, one of said arms being bent back to form a parallel extension having a downwardly extending attaching flange, and a wiping felt covering the opposed faces of the first mentioned arms and adapted to receive a gauge rod therebetween.

In testimony whereof I hereunto affix my signature.

ALPHA O. HOLVECK, Jr.